United States Patent [19]
Biegelsen et al.

[11] Patent Number: 5,717,283
[45] Date of Patent: Feb. 10, 1998

[54] DISPLAY SHEET WITH A PLURALITY OF HOURGLASS SHAPED CAPSULES CONTAINING MARKING MEANS RESPONSIVE TO EXTERNAL FIELDS

[75] Inventors: David K. Biegelsen, Portola Valley; Warren B. Jackson, San Francisco; Guerino G. Sacripante, Oakville; James Mikkelsen, Los Altos; Thomas W. Smith, Tenfield; Nicholas K. Sheridon, Los Altos, all of Calif.

[73] Assignee: Xerox Corporation, Stamford, Conn.

[21] Appl. No.: 582,311

[22] Filed: Jan. 3, 1996

[51] Int. Cl.[6] .................................................. H01J 63/04
[52] U.S. Cl. .............................. 313/483; 313/493; 313/634
[58] Field of Search .............................. 313/358, 483, 313/493, 634; 359/247

[56] References Cited

U.S. PATENT DOCUMENTS

| | | | |
|---|---|---|---|
| 3,974,638 | 8/1976 | Haser | 368/227 |
| 4,332,096 | 6/1982 | Kohner et al. | 40/486 |

*Primary Examiner*—Sandra L. O'Shea
*Assistant Examiner*—Vip Patel
*Attorney, Agent, or Firm*—Fariba Rad

[57] ABSTRACT

An external field activated display sheet is disclosed which comprises a plurality of hourglass shaped capsules for each pixel of an image. Each hourglass shaped capsule contains ink in one of its chambers. The ink in each hourglass shaped capsule is responsive to an external field being applied across the capsule for the movement from one chamber to the other. An opaque medial sheet blocks the visibility of the ink in the chambers under the medial sheet. Applying an external field across an hourglass shaped capsule causes the ink to be moved into the chamber above the medial sheet where it is visible. By applying an external field across selective hourglass shaped cavities, an image can be displayed.

34 Claims, 7 Drawing Sheets

5,717,283

DISPLAY SHEET WITH A PLURALITY OF HOURGLASS SHAPED CAPSULES CONTAINING MARKING MEANS RESPONSIVE TO EXTERNAL FIELDS

BACKGROUND OF THE INVENTION

This invention relates to external field activated displays and more particularly concerns an external field activated display sheet which utilizes ink in a plurality of hourglass shaped capsules in which the ink can be moved from one chamber of the hourglass shaped capsule into the other chamber of the hourglass shaped capsule by applying an external field across the hourglass shaped capsule.

An external field activated display, in sheet form, comprises a thin sheet which has many attributes of a paper document. It looks like paper, has ambient light modulation behavior like paper (for example, the brighter the ambient light, the more easily it may be seen), is flexible like paper, can be carded around like paper, can be written on like paper, can be copied like paper, and has nearly the archival memory of paper.

There have been different approaches to make an external field activated display sheet such as U.S. Pat. No. 4,126,854 titled "Twisting Ball Panel Display" in which the display panel is comprised of a plurality of spherical particles which have different colors on each hemisphere. Depending on the direction of an electric field (external field) applied to each spherical particle, one of the hemispheres will be displayed. In this approach, for a black and white display sheet, each ball has a black hemisphere and a white hemisphere. The black and white hemispheres of the spherical particles can be selected in such a manner to display a desired image or text.

It is an object of this invention to provide a different approach to make an external field activated display sheet.

SUMMARY OF THE INVENTION

In accordance with the present invention, an external field activated display sheet is disclosed which comprises a plurality of hourglass shaped capsules. Each hourglass shaped capsule contains ink in one of its chambers which is responsive to an external field for the movement from one chamber into another. An opaque medial sheet blocks the visibility of the ink in the chambers below the medial sheet. Applying an external field across an hourglass shaped capsule causes the ink to be moved from a chamber below the medial sheet into the chamber above the medial sheet where the ink is visible. Applying an external field across selective hourglass shaped capsules creates a desired image above the medial sheet.

DETAILED DESCRIPTION OF THE INVENTION

Figure 1:
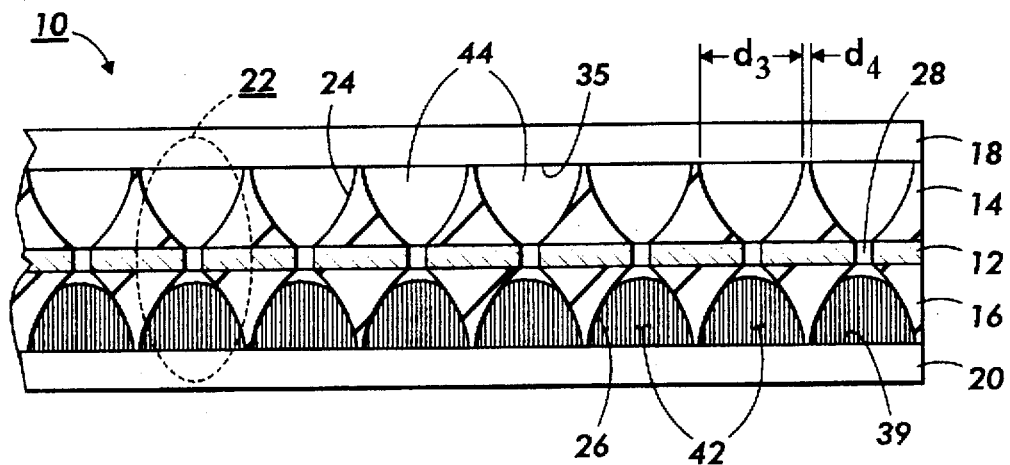
FIG. 1 shows a pixel wide cross sectional view of the preferred embodiment of the electric display sheet of this invention.

Referring to FIG. 1, there is shown a pixel wide cross sectional view of the preferred embodiment of the external field activated display sheet 10 of this invention. Since the external field activated display sheet 10 is designed to be responsive to an electric field as its external field, hereinafter the "external field activated display sheet 10" is referred to as "electric display sheet 10". Hereinafter any "external field activated display sheet" which uses an electric field as its external field is referred to as "electric display sheet".

The electric display sheet 10, which generally has a thickness less than 20 mils, comprises five sheets 12, 14, 16, 18 and 20. Sheet 12 (the medial sheet) is a thin, flexible, white, opaque and highly reflective material such as $TiO_2$-filled polymer membrane. Sheets 14 and 16 are made of a flexible material, typically a thick film photoresist such as Riston®, Vacrel® or Parad® (available from DuPont); Shipley Microposit® STR™ 1000 and the like or one of the AZ™ resists, typified by AZ 100. Sheets 18 and 20 may be comprised of any a wide range of transparent polymers commercially available in film or sheet form including: poly(ethylene terephthalate) (Mylar®), bis-phenol-A poly (carbonate) (Lexan®), poly(methylmethacrylate) (Plexiglas ®), etc. "Transparent as used herein shall mean "of such fine or open texture that objects may be easily seen on the other side". Sheets 12, 14, 16, 18 and 20 are all bonded together.

The electric display sheet 10 has a plurality of hourglass shaped capsules 22. The hourglass shaped capsules 22 are located within sheets 12, 14 and 16 and are sealed by sheets 18 and 20. Each hourglass shaped capsule has two chambers 24 and 26 and a neck portion 28. Chambers 24 are cup shaped cavities within sheet 14 and chambers 26 are cup shaped cavities within sheet 16. The neck portions 28 of the hourglass shaped capsules 22 are holes within sheet 12.

It should be noted that in all the drawings of this specification for the purpose of clarity where there is a plurality of each element only a few are numbered. However, it should be understood that all the elements that have the same shape as the numbered elements are the same as the numbered elements.

Figure 2:
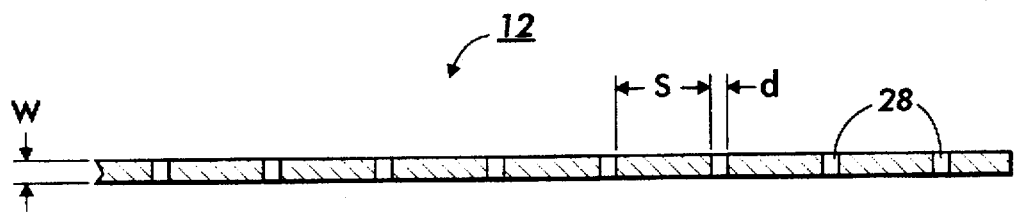
FIG. 2 shows sheet 12 of FIG. 1 which has a plurality of holes through its width.

Referring to FIG. 2, sheet 12 has a plurality of holes 28 through its width W. The holes 28 which have a diameter d in the range between 1 micron and 30 microns are uniformly spaced from each other. The space S between the holes is in the range between 10 microns and 100 microns. In the preferred embodiment of this invention the holes are created to have a uniform distribution over the entire sheet 12. However, the uniform distribution is not necessary.

Figure 3:
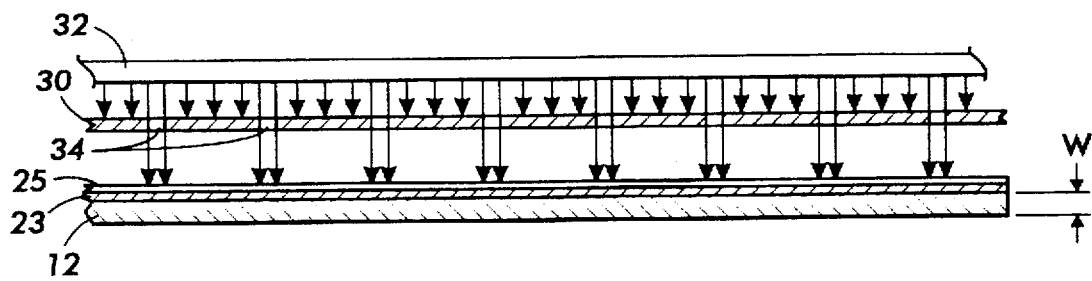
FIG. 3 shows sheet 12 of FIG. 1 being exposed to an ultraviolet light source through a mask.

The holes 28 in the sheet 12 are created either by photolithography, by energetic particle damage and subsequent etching, by laser ablation or other means. Referring to FIG. 3, the preferred embodiment of this invention uses photolithography to create holes 28.

To create holes 28 in the sheet 12, a thin layer 23 (about 100 nm) of a material such as aluminum is deposited on sheet 12 and a layer 25 of positive working photoresist such as Shipley 1350 is deposited on the layer 23 of aluminum. Next, sheet 12 is exposed to the UV light from the UV light source 32 through a mask 30. Mask 30 has a uniform distribution of circular openings 34 for the light to pass. After the UV exposure, the photoresist layer 25 is developed to generate holes where layer 25 was exposed to the UV light. At this stage, the aluminum will be etched by an etchant such as nitric acid through the holes of the photoresist to expose sheet 12. Then, sheet 12 is placed on a platform in a plasma etcher. Oxygen plasma from the plasma etcher removes the photoresist layer 25 and etches through the width w of the sheet 12 creating a plurality of uniformly distributed holes 28. Finally, the aluminum layer 23 is removed from the sheet 12 by passing the sheet 12 through an aluminum selective etch bath such as dilute HCl.

Referring back to FIG. 1, the two sheets, 14 and 16, are both insulating thick films, fabricated and patterned using any number of commercially available thick film resists described earlier. Each one of sheets 14 and 16 has a plurality of cup shaped cavities 24 and 26 respectively that are aligned with and attached to the holes 28 of sheet 12 creating hourglass shaped cavities 22.

Figure 4:
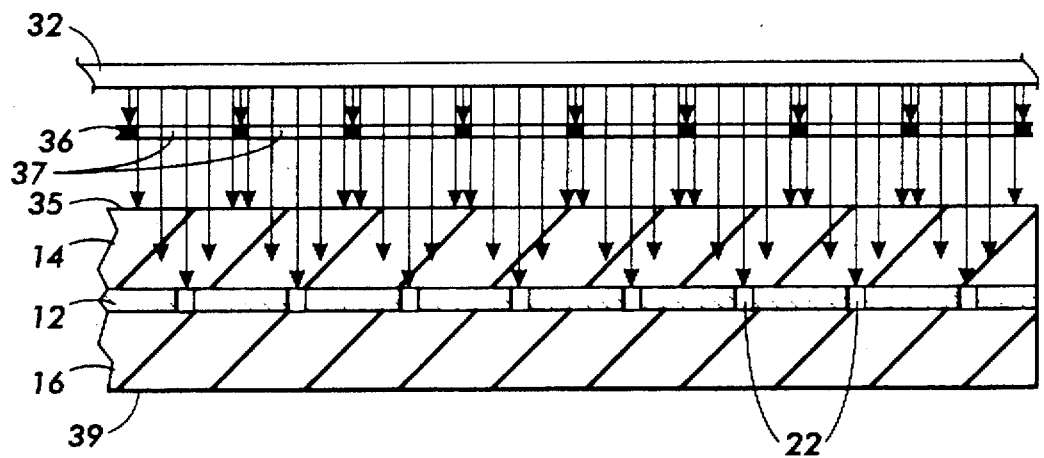
FIG. 4 shows sheet 14 of FIG. 1 being exposed to an ultraviolet light source through a mask.
Figure 5:
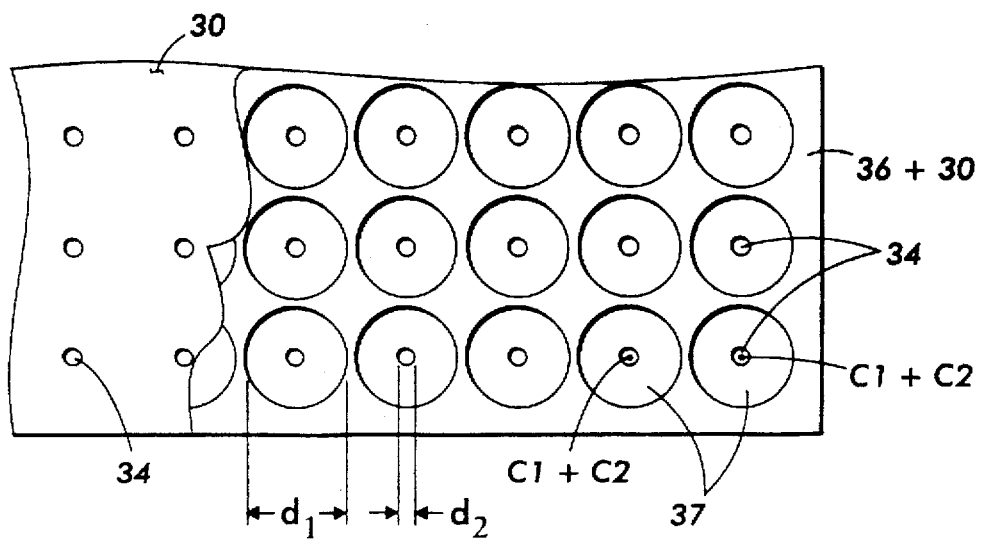
FIG. 5 shows the difference between the holes of the two masks used for exposing sheets 12 and 14 of FIG. 1.

The cavities 24 of sheet 14 and the cavities 26 of sheet 16 are created after the sheets 14 and 16 are bonded to sheet 12. The bonding of sheets 14 and 16 onto the sheet 12 should not fill the holes 28. Referring to FIG. 4, once the sheets 14 and 16 are bonded to sheet 12, a collimated UV light from the light source 32 is used to expose sheets 14 and 16 through a mask 36. Mask 36 has a plurality of circular openings 37 which are centered at the same positions as the center of the openings 34 of mask 30 of FIG. 3. Referring to FIG. 5, if the mask 36 of FIG. 4 is placed over the mask 30 of FIG. 3, each opening 37 of mask 36 has a center $C_1$ which coincides with the center $C_2$ of a corresponding opening 34 of mask 30. However, the openings 37 of mask 36 have a larger diameter $d_1$ compared to the diameter $d_2$ of the openings 34.

Figure 6:
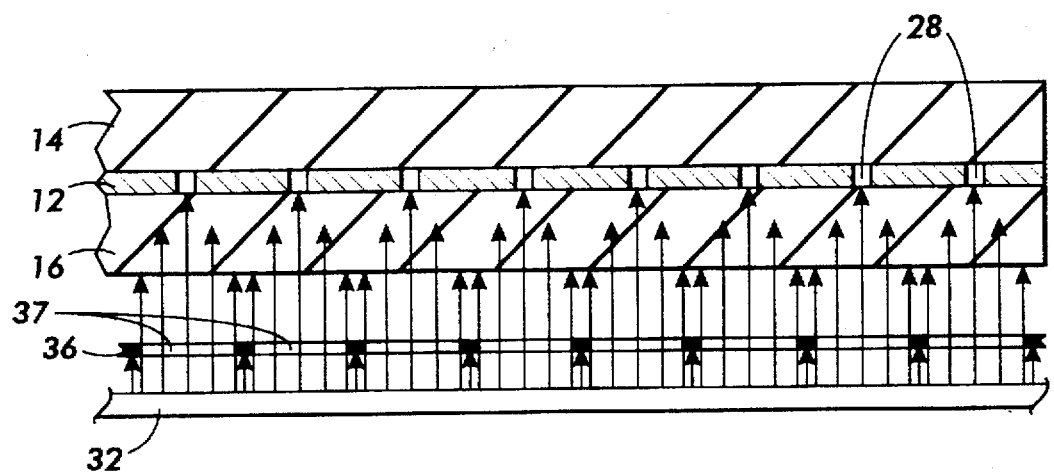
FIG. 6 shows sheet 16 of FIG. 1 being exposed to an ultraviolet light source through a mask.

Referring back to FIG. 4, mask 36 is placed between sheet 14 and the light source 32 in such a manner that each opening 37 of the mask 36 is aligned with a corresponding hole 28 of sheet 12. With this arrangement, sheet 14 is exposed to the UV light through the openings 37 of mask 36 Then, the light source 32 and the mask 36 will be moved to expose sheet 16. Referring to FIG. 6, mask 36 is placed between sheet 16 and the light source 32 in such a manner that each opening 37 of the mask 36 is aligned with a corresponding hole 28 of sheet 12. With this arrangement, sheet 16 is exposed to the UV light through the openings 37 of mask 36.

In both FIGS. 4 and 6, the light beam passing through the holes 37 is shown with different length arrows. The lengths of the arrows represent the intensity of the light beam which indicate that the illumination of the sheets 14 and 16 closer to the edges of the holes is less than the illumination near the center of the holes.

Figure 7:
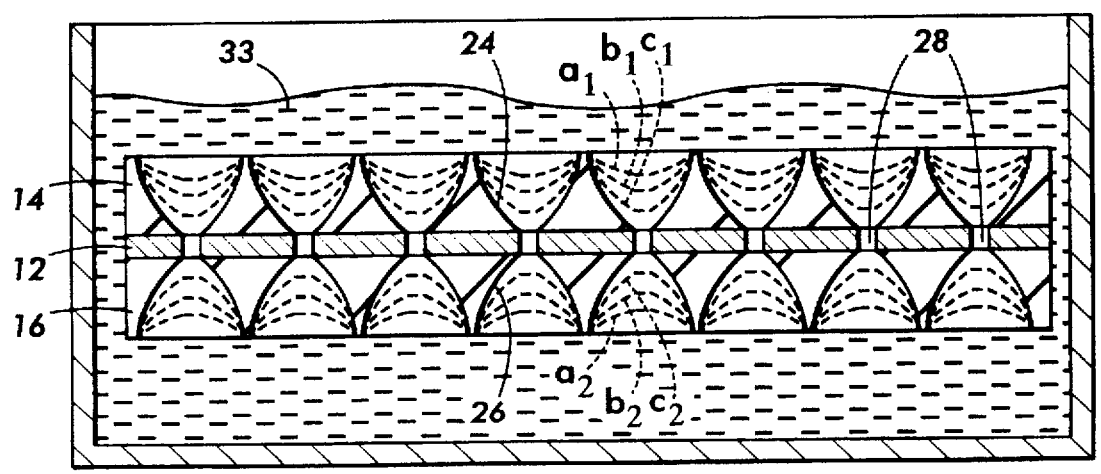
FIG. 7 shows how the cavities 24 and 26 of FIG. 1 are gradually etched.

Referring to FIG. 7, after sheets 14 and 16 have been exposed to the UV light, then the bonded sheets 12, 14 and 16 are placed in a developer solution 33 in order to develop the exposed areas into cavities 24 and 26 of FIG. 1. It should be noted that developer solution 33 does not etch the material of sheet 12. Once the cavities 24 and 26 are developed, the bonded sheets 12, 14 and 16 are removed from solution 33 and rinsed.

Referring back to both FIGS. 1 and 5, since sheets 14 and 16 are exposed to the UV light through larger openings 37 of mask 36 compared to the openings 34 of mask 30, the cavities 24 and 26 are larger than the holes 28 of sheet 12.

Cavities 24 and 26 have a cup shape since the developer solution 33 has to gradually etch into sheets 14 and 16. In FIG. 7, three stages $a_1$, $b_1$, and $c_1$ of gradual etching of cavities 24 and three stages $a_2$, $b_2$ and $c_2$ of gradual etching of cavities 26 are shown. Ultrasonic agitation can be used to make the etching and removal of material more uniform.

Therefore, due to gradual etching, cavities 24 and 26 have larger openings at surfaces 35 and 39 of the sheets 14 and 16 respectively than the openings at the neck portions 28. The diameters $d_3$ of the cavities 24 and 26 on surfaces 35 and 39 respectively are selected to allow a minimum distance $d_4$ of about 5 microns between any two adjacent cavities.

It should be noted that the cavities 24 and 26 and the holes 28 can have any shape. However, the holes 28 of sheet 12 should always be smaller than the cavities 24 and 26 to create the restriction of an hourglass neck.

It should also be noted that the disclosed embodiment of this invention is not limited to the described method in which the holes 28 and the cavities 24 and 26 are created. Any method which can create the holes 28 and cavities 24 and 26 can replace the disclosed method of creating holes 28 and cavities 24 and 26. Furthermore, the order in which the holes 28 and cavities 24 and 26 are created is immaterial.

Figure 8:
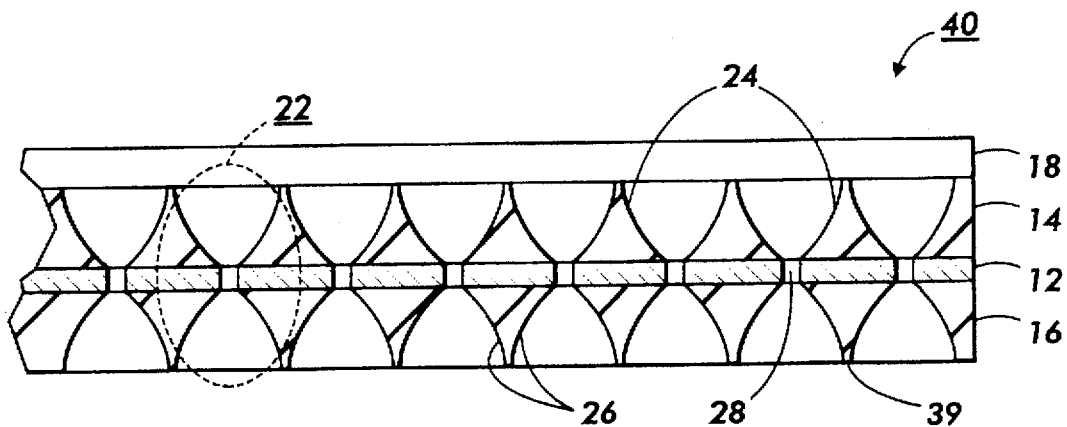
FIG. 8 shows sheet 18 is bonded to sheet 14 of FIG. 1 in order to seal the cavities of sheet 14.

The cavities 24 and 26 along with the holes 28 create hourglass shaped cavities 22. Referring to FIG. 8, after the hourglass shaped cavities 22 are created, a thin transparent sheet 18 is bonded to sheet 14 to seal the cavities 24 of sheet 14. At this stage in the fabrication, liquid ink has to be placed in the hourglass shaped cavities 22.

In this invention, two examples of methods, which are used to place the ink in the hourglass shaped cavities 22, are given. In the first method the structure 40 of FIG. 8 is chilled in a dry atmosphere. The structure is inverted in order to place the cavities 26 of the sheet 16 upwards in order to receive ink. Next, frozen, monodisperse spheres of a selected ink are poured into the cavities 26 and agitated until all cavities 26 are occupied. The excess spheres are swept off and the structure 40 is returned to room temperature. At room temperature, the ink melts. At the last step, sheet 20 is bonded to sheet 16 to seal the cavities 26 of the sheet 16 and to complete the structure 10 of FIG. 1.

In the second method, the structure 40 is brought into touching contact with a liquid ink in a tray in such a manner that the cavities 26 of the sheet 16 contact the ink. Then, the structure 40 of FIG. 8 is pressurized from above to deform sheet 18 into the cavities 24 of the sheet 14 while the structure 40 rests on the surface of the tray containing liquid ink. Next, the pressure on the pressurized structure 40 is removed and the sheet 18 returns to a mostly planar form. This causes the ink to be pulled into the cavities 26 of sheet 16. By bonding a sheet 20 onto the sheet 16, the cavities 26 of the sheet 16 are sealed and the structure 10 of FIG. 1 is completed.

While each cavity 26 is shown as filled with ink 42 below its respective hole 28 in FIG. 1, it should be noted that the ink 42 could extend into or slightly above the hole 28.

Referring back to FIG. 1, once the sheet 20 is bonded to the sheet 16, the hourglass shaped cavities 22 are sealed, thereby forming hourglass shaped capsules 22, the cavities 24 and 26 form chambers 24 and 26 of the hourglass shaped capsules 22 and the holes 28 form the neck portion 28 of the hourglass shaped capsules 22.

It should be noted that the selection of the number of the hourglass shaped capsules per pixel is a matter of choice.

It should also be noted that placing the ink into the hourglass shaped cavities 22 of disclosed embodiment of this invention is not limited to the two aforementioned methods. Any method that can place the ink into the hourglass shaped cavities 22 can be employed to replace the two aforementioned methods.

It should further be noted that in FIG. 1, ink 42 fills a portion of each hourglass shaped capsule 22 and the remaining portion 44 of the hourglass shaped capsule is filled with air. However, it should also be noted that the remaining portion 44 of the hourglass shaped capsules can be filled with an inert gas, an immiscible liquid or the remaining portion of the hourglass shaped capsule can be evacuated to have vacuum. The immiscible liquid may be transparent or may have color. In order to fill the hourglasses with an inert gas, the ink 42 is placed in the hourglass shaped capsules 22 in an environment which is first evacuated and then filled with inert gas. Therefore, after the ink 42 is placed in the hourglass shaped capsules 22 and the sheet 20 is bonded to sheet 16, the hourglass shaped capsules 22 contain ink 42 and inert gas (in the remaining portion 44).

It should finally be noted that in FIG. 1, sheet 20 does not have to be transparent and preferably sheet 20 is white and opaque.

In operation, referring to FIG. 1, when the ink 42 is in chambers 26, the electric display sheet will appear white since all the ink, which has a different color than white, is under the sheet 12 which is white. In order to create a dot over the sheet 12, ink 42 in an hourglass shaped capsule 22 has to be moved from the chamber 26 into chamber 24.

Figure 9:
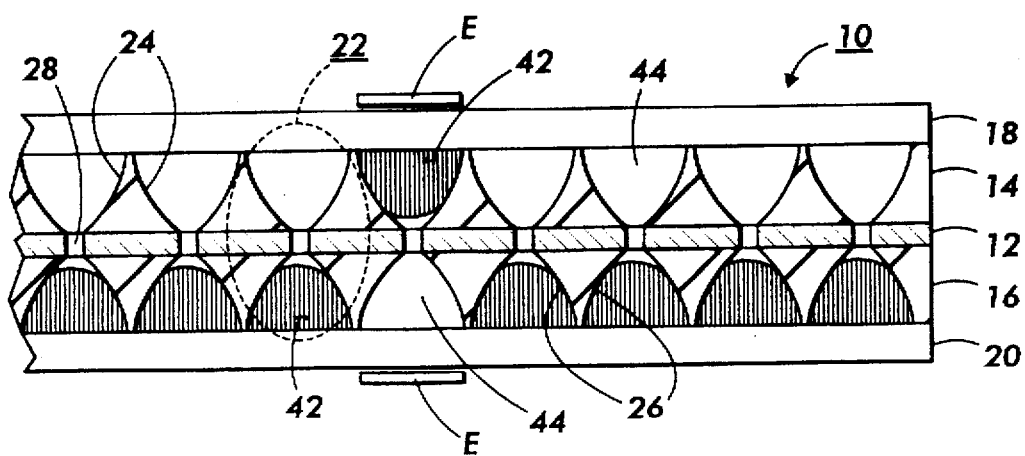
FIG. 9 shows the electric display sheet of FIG. 1 in operation.

Referring to FIG. 9, once a voltage of magnitude in the range between 50 and 500 volts (depending on the materials and the thickness of the materials used for the display sheet) is applied across an hourglass shaped capsule 22 via electrodes E, the ink 42, which is charged due to zeta potential between ink and chamber walls, will be moved from one chamber of an hourglass shaped capsule into another. While the ink 42 is moving from one chamber into another, the air in the chamber which is receiving the ink 42 squeezes by the ink 42 at the neck portion 28 and moves into the chamber from which the ink 42 is exiting. By reversing the polarity of the voltage, the ink 42 can be moved back into the original chamber. When the ink 42 is moved to chamber 24 or chamber 26, it is pulled against sheet 18 or 20 respectively. However, regardless of the chamber in which the ink 42 is located, once the electric field is removed, the ink 42 remains in the respective chamber.

Figure 10:
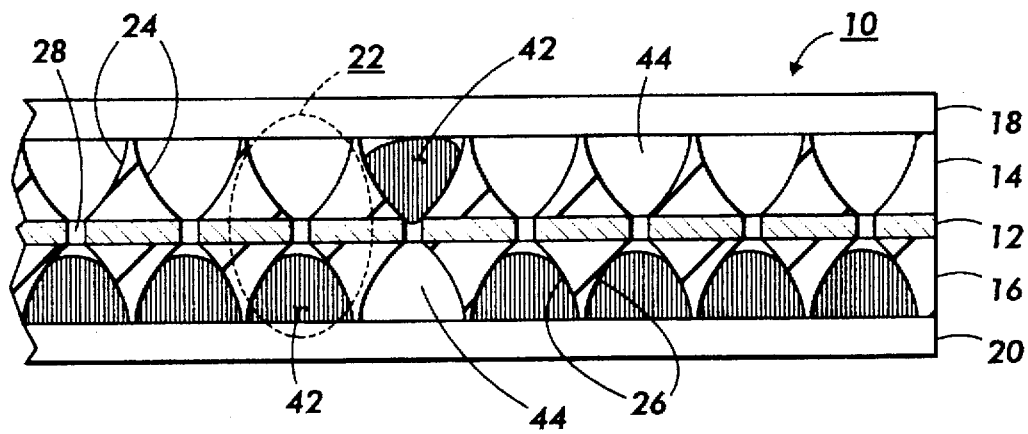
FIG. 10 shows once the electric field of FIG. 8 is removed the ink will stay in the same chamber.

Referring to FIG. 10, if the ink 42 is in chamber 24 and if the electric display sheet 10 is placed horizontally, upon removal of the electric field, gravity tends to pull the ink away from the sheet 18. However, the ink 42 remains in chamber 24 at the vicinity of the neck portion 28. In the absence of an electric field, the surface tension of the ink prevents the ink from moving into the lower chamber 26.

Referring back to FIG. 9, if the ink is in chamber 26 and if the electric display sheet 10 is placed horizontally, upon removal of the electric field, due to the force of gravity, the ink tends to stay more against sheet 20.

Typically, an electric field is applied across each hourglass shaped capsule through sheets 18 and 20. If the ink has a positive charge, the negative terminal of the electric field will be applied to sheet 18 and the positive terminal of the electric field will be applied to the sheet 20. If the chosen ink has a negative charge, the connection of the terminals of the electric field to sheets 18 and 20 is reversed. The electric field crosses sheets 18 and 20 and through the corresponding hourglass shaped capsule without significantly affecting other hourglass shaped capsules. Therefore, by applying a proper electric field, the ink 42 in an hourglass shaped capsule 22 is moved from one chamber of the hourglass shaped capsule 22 into the other. Once the ink 42 is moved into chamber 24, it appears as a black dot against a white background assuming that the ink is black.

Referring back to FIG. 1, it should be noted that the hourglass shaped capsules 22, belong to one pixel. Each pixel can have 1 to 100 or more hourglass shaped capsules. Therefore, if an electric field is applied to all the hourglass shaped capsules of a pixel, then the ink 42 in those hourglass shaped capsules will move into the chambers 24 causing that pixel to be seen as a black pixel (again assuming that the ink is black). The combination of the plurality of dots in each pixel create that pixel.

Since each hourglass shaped capsule can be addressed individually, a selected number of hourglass shaped capsules can be activated. "Activating an hourglass shaped capsule" as used herein shall mean that an electric field has been applied to the hourglass shaped capsule in order to move the ink 42 from chamber 26 into the chamber 24 and "deactivating an hourglass shaped capsule" as used herein shall mean that the applied electric field across the hourglass shaped capsule is reversed in order to move the ink 42 from chamber 24 back into the chamber 26. By selectively activating the hourglass shaped capsules of each pixel, different shades of gray can be created within each individual pixel.

It should be noted that inks can be designed with broad ranges of independently settable parameters such as dielectric constant, zeta potential, viscosity, surface energy and vapor pressure which are dominated by a carrier liquid. A carder liquid is a liquid which receives color dyes or pigments in order to create an ink. Typically, optical properties are dominated by the color dyes or pigments and they are separable from the rheological (science of flow of the matter) properties which are dominated by the carder liquid. However, with enough pigments, the theological properties can also be dominated by the pigments. Therefore, usually if a clear liquid is colored by dyes or pigments, the carrier liquid can be selected to have the required theological properties and the color pigments can be selected to have the designed optical properties. The ink could also be a liquid metal such as mercury or gallium.

Due to the fact that an electric field is used to move the ink from one chamber of an hourglass shaped capsule into the other, the ink has to be selected to develop a maximum charge.

In addition, the ink should not be wetting relative to the chamber walls. Therefore, the ink can be selected to be water based or oil based depending on if the walls of the hourglass shaped capsules are chosen to be hydrophobic or hydrophilic respectively. Furthermore, while the ink can be polar or non-polar, the liquid filling the remaining portion of the hourglass shaped capsules has to be non-polar.

It should be noted that any ink which can be moved from one chamber of an hourglass shaped capsule into the other chamber of the hourglass shaped capsule, under an external field, can replace the inks in the hourglass shaped capsules of this invention.

Figure 11:
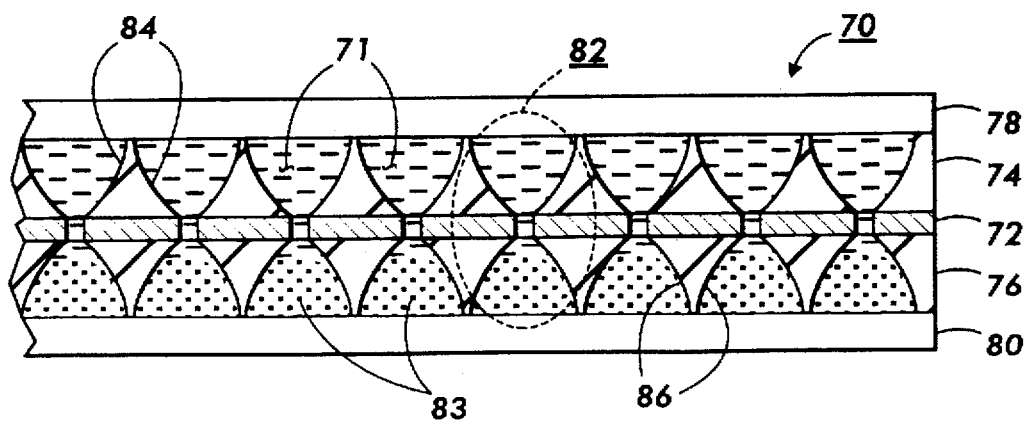
FIG. 11 shows an electric display sheet of this invention in which the hourglass shaped capsules are filled with a clear liquid which contain color pigments.

Referring to FIG. 11, there is shown an alternative electric display sheet 70 of this invention in which the hourglass shaped capsules are completely filled with a clear liquid which contains colored pigments. The liquid used in the electric display sheet 70 has to be electrically insulating. In FIG. 11, sheets 72, 74, 76, 78 and 80 have the same properties and serve the same purpose as the sheets 12, 14, 16, 18 and 20 of electric display sheet 10 of FIG. 1. Since the hourglass shaped capsules 82 are filled with the clear liquid, there is no space for any gas or air in the hourglass shaped capsules 82. In this approach, by applying an electric field, the pigments 83 can be moved by electrophoretic force from chamber 86 into the chamber 84 or vise versa.

The electrophoretic particles have a tendency to pack on sheet 78 (where sheet 78 encloses the hourglass shaped cavities 82) in an applied electric field. Also, electrophoretic particles have a tendency to agglomerate when there is no electric field and deagglomerate when there is an electric field. Based on aforementioned tendencies of electrophoretic particles, upon removal of the electric field, the pigments remain in their corresponding chamber until a reverse electric field is applied to the hourglass shaped capsules 82 to pull the pigments back into the original chamber.

It should be noted that in this approach, to fill the hourglass shaped capsules 82, the bonded sheets 72, 74 and 76 are placed in a confinement where there is a clear liquid filled with the suspended pigments. By using vacuum or ultrasonic agitation, the liquid permeates all the hourglass shaped cavities 82. Once the hour glass shaped cavities 82 are filled, sheets 78 and 80 are bonded to sheets 74 and 76 respectively.

Figure 12:
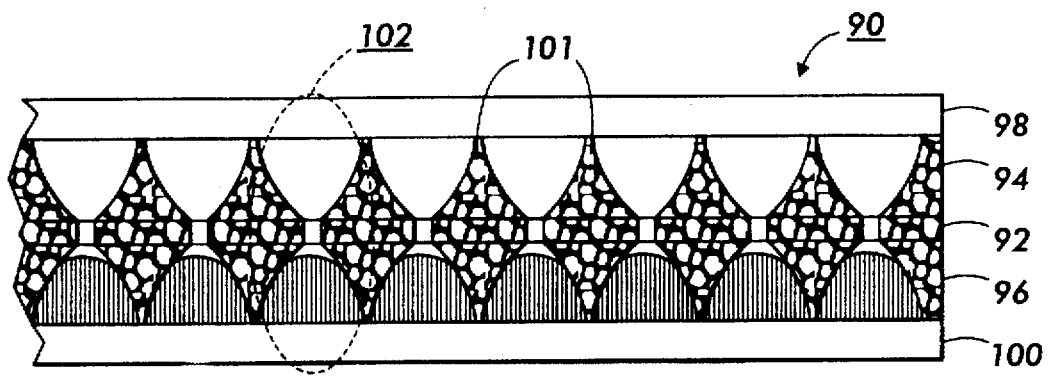
FIG. 12 shows an alternative embodiment of this invention.

Referring to FIG. 12, there is shown an alternative electric display sheet 90 of this invention. The structure 90 is fabricated in the same manner as the structure 10 of FIG. 1. Sheets 98 and 100 have the same properties and serve the same purpose as sheets 18 and 20 of the FIG. 1 respectively. Sheets 92, 94 and 96, serve the same purpose as the sheets 12, 14 and 16 of FIG. 1 respectively. However, sheets 92, 94 and 96 have a plurality of connected pores 101 which are also connected to the hourglass shaped capsules 102. The pores 101 are small enough to prevent any liquid from entering into them. Yet, any gas can pass through the pores 101. Furthermore, sheets 92,94 and 96 are non-wetting material. The sheets 92, 94 and 96 are selected to have pores 101 in order to equilibrate the inert gas or the air in the hourglass shaped capsules 102 while the ink is moving from one chamber of the hourglass shaped capsules 102 into the other.

Another alternative is to have pores in sheets 98 and 100 to equilibrate the inert gas or the air in the hourglass shaped capsules 102. However, in this approach, the outer surfaces of sheets 98 and 100 have to be hermetically sealed.

The electric display sheets 10, 50, 70 and 90 of FIGS. 1, 10 and 11 respectively can be modified to display color images. By dividing the hourglass shaped capsules of each pixel into three groups and placing a different color ink (red, green and blue) in the hourglass shaped capsules of each group a color electric display sheet can be generated. It should be noted that any three complementary colors which can create the spectrum of colors can be used. By selecting a proper number of hourglass shaped capsules of each color, different color and different shades of a color can be created on each pixel.

The structures shown in FIGS. 1, 11 and 12 do not contain any element to provide electric field. Therefore, to activate the hourglass shaped capsules, an external medium has to be utilized. For example, a plurality of electric fields which are placed on one line can be utilized as an activating bar. An electric display sheet can be scanned by the activating bar along the length or along the width of the sheet depending on the size of the activating bar. By scanning the electric display sheet, the hourglass shaped capsules can be selectively activated line by line.

In this method, for the best result, the number of the electric fields should be equal to the number of hourglass shaped capsules on each line and the spacing between the electric fields should be equal to the spacing between the hourglass shaped capsules. However, since each pixel has a plurality of hourglass shaped capsules, it is not necessary to have the same number of electric fields as the number of the hourglass shaped capsules.

For example, each electric field can activate more than one hourglass shaped capsule. This also applies to the electric display sheets with non-uniform distribution. Since in the non-uniform distribution, the spacing and the number of the hourglass shaped capsules differ from line to line, the hourglass shaped capsules should be activated by a given number of electric fields with a fixed spacing. Therefore, in this method each electric field will activate one or more hourglass shaped capsules on each line.

It should be noted that activating more than one hourglass shaped capsule by each electric field results in a lower resolution.

However, increasing the number of electric fields increases the resolution. In addition, as the number of the electric fields per pixel is increased beyond one per pixel and as the increased number approaches the number of hourglass shaped capsules, more shades of gray can be achieved at each pixel.

Another method of activating an electric display sheet is to utilize a page activating device. In this method, the activating device is large enough to receive an electric display sheet and it has enough electrodes to activate the entire hourglass shaped capsules of one sheet simultaneously.

Yet another method of activating an electric display sheet is to use an electric pen which generates an electric field relative to a reference (ground) plane held on the opposite side of the sheet compared to the side on which the pen is used.

The aforementioned methods are utilized for an electric display sheet that does not contain elements to provide electric fields. However, another approach to activate the hourglass shaped capsules is to add elements to the electric display sheet to create a self contained activating device. This kind of electric display sheet is called smart electric display sheet.

Figure 13:
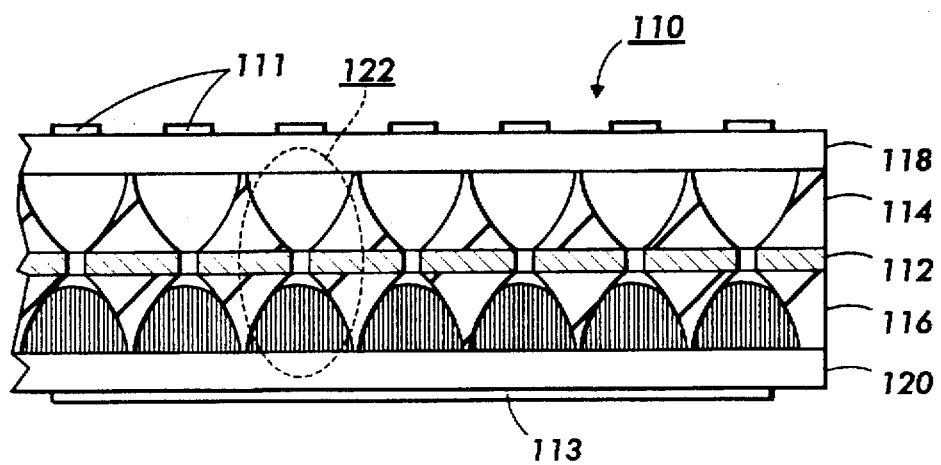
FIG. 13 shows an electric display sheet which has a pair of electric field generating elements for each hourglass shaped capsule to provide an electric field across each hourglass shaped capsule.

Referring to FIG. 13, there is shown a smart electric display sheet 110 in which electric field generating elements (conductive strips) 111 and 113 are placed on sheets 118 and 120 respectively. In FIG. 13, sheets 112, 114, 116, 118 and 120 have the same properties and serve the same purpose as the sheets 12, 14, 16, 18 and 20 of electric display sheet 10 of FIG. 1 respectively.

Figure 14:
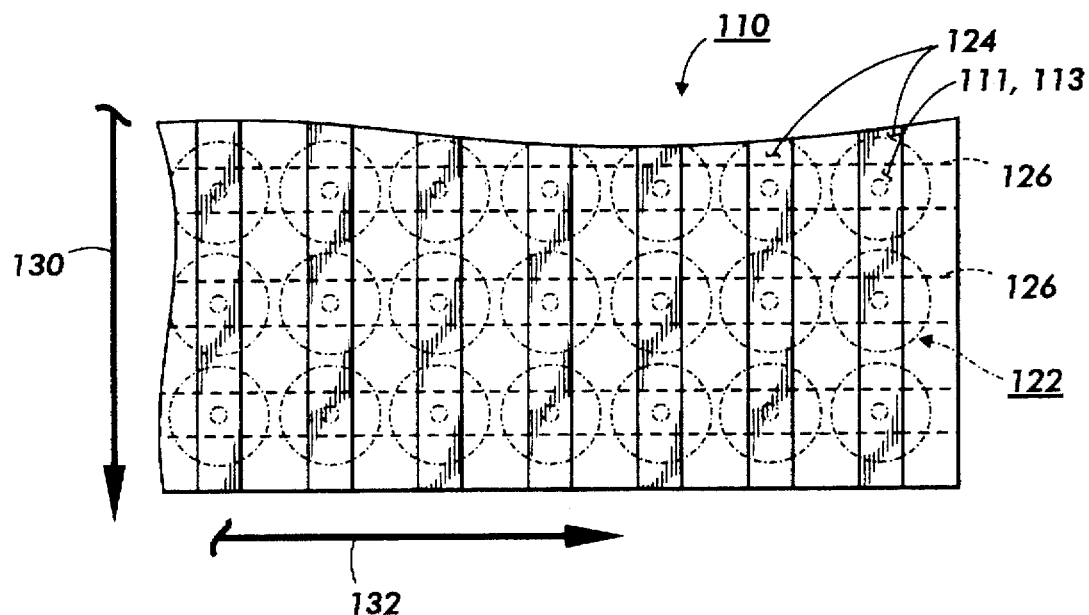
FIG. 14 shows a portion of the top view of the electric display sheet of FIG. 13.

Referring to FIG. 14, there is shown a top view of sheet 110. Conductive strips 124 are placed on sheet 118 which form lines parallel to the edge 130 of sheet 118. Also conductive strips 126 are placed on sheet 120 which form parallel lines along the length 132 of sheet 120. When a given strip 124 and a given strip 126 are activated, an electric field is created at the crossing point (111 on sheet 118 and 113 on sheet 120) which causes the ink in the corresponding hour glass shaped capsule 122 to move from one chamber into another.

In the preferred embodiment of this invention, each crossing point aligns with a corresponding hourglass shaped capsule 122. However, the crossing points can be larger than the hourglass shaped capsules 122 in order to each activate more than one hourglass shaped capsule 122. Furthermore, the strips 124 of sheet 118 are optically transparent conductors such as indium tin oxide.

It should be noted that the initiation of the flow of liquid from one chamber of the capsule 122 into another exhibits a sharp threshold with respect to the electric field. This characteristic enables the electric display sheet 110 to be used in conjunction with a passive addressing matrix.

Figure 15:
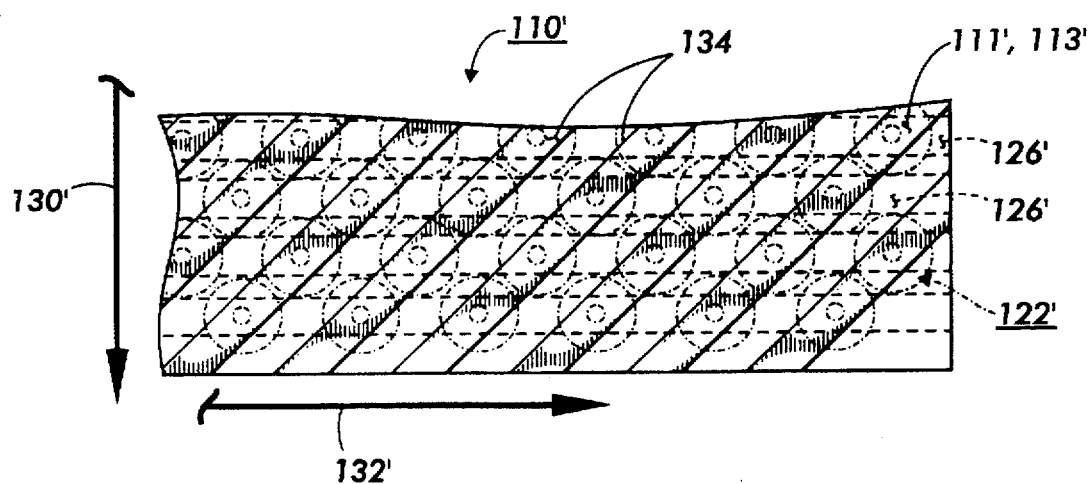
FIG. 15 shows a more compact configuration of electric field generating elements.

Referring to FIG. 15, for a more compact configuration of the hourglass shaped capsules 122, conductive strips 134 are arranged in such a manner that they form parallel lines which are diagonal with respect to the strips 126'. In FIG. 15, those elements which are the same as disclosed in the description of FIG. 14, are designated by the same reference numerals with a prime "'" affixed thereto. Again when a given strip 134 and a given strip 126' are activated, an electric field is created at the crossing point (136 on sheet 118' and 138 on sheet 120') which causes the ink in the corresponding hour glass shaped capsule 122 to move from one chamber into another.

The smart electric display sheet is capable of activating or deactivating the hourglass shaped capsules by a passive matrix addressing using a plurality of voltage sources contacting the display sheet at the sides of the sheet.

The preferred embodiment of this invention utilizes electric field as its external field to move the ink in an hourglass shaped capsule. However, it should be noted that any external field which can cause the ink to move from one chamber of an hourglass shaped capsule can replace the electric field of this invention. For example, ink can be moved through acoustic fields, dielectric forces by applying electric field gradients or, if ferrofluids are used, ink can be moved by applying a magnetic field.

While this invention has been described based on an electric display which is utilized as a paper, it should be noted that the electric display of this invention can also be utilized to replace other electric displays such as the display of a monitor or a display of a watch.

The advantage of the display disclosed in this invention over a conventional display is that a conventional display, requires back illumination. Therefore, the operation of a conventional display requires a higher electric power than the electric power needed for the display of this invention. The display of this invention requires a minimal electric power to move the ink from one chamber to the other. After the image is displayed, until the next change on the image, there is no need for electric power since the display functions as a printed paper.

It should be understood that numerous changes in details of construction and the combination and arrangement of elements and materials may be resorted to without departing from the true spirit and scope of the invention as hereinafter claimed.

We claim:

1. An external field activated display sheet comprising:
   a plurality of generally spaced apart hourglass shaped capsules;
   each one of said plurality of hourglass shaped capsules having two opposed chambers separated by a neck portion;
   said opposed chambers being in communication with each other through said neck portion;
   each one of said plurality of hourglass shaped capsules being partially filled with marking means; and
   said marking means in each hourglass shaped capsule being responsive to an external field across its corresponding hourglass shaped capsule for movement from one chamber of hourglass shaped capsule through said neck portion into the other chamber of hourglass shaped capsule.

2. The external field activated display sheet recited in claim 1, wherein said external field is an electric field.

3. The external field activated display sheet recited in claim 1, wherein said marking means so constructed and arranged to remain in its corresponding chamber after removal of the external electric field.

4. The external field activated display sheet recited in claim 3, wherein said marking means is a dyed liquid.

5. The external field activated display sheet recited in claim 3, wherein said marking means is a pigmented liquid.

6. The external field activated display sheet recited in claim 3, wherein said marking means is a liquid metal.

7. The external field activated display sheet recited in claim 3, wherein the portion of each capsule which is not filled with marking means is filled with air.

8. The external field activated display sheet recited in claim 3, wherein the portion of each capsule which is not filled with marking means is filled with an inert gas.

9. The external field activated display sheet recited in claim 3, wherein the portion of each capsule which is not filled with marking means is filled with a liquid.

10. The external field activated display sheet recited in claim 9, wherein said liquid is a clear liquid.

11. The external field activated display sheet recited in claim 9, wherein said liquid is a colored liquid.

12. The external field activated display sheet recited in claim 1, wherein said external field is a magnetic field.

13. The external field activated display sheet recited in claim 12, wherein said marking means is a pigmented ferrofluids.

14. An external field activated display sheet comprising:
   a medial sheet having a plurality of cavities;
   said medial sheet having two opposing surfaces;
   a first sheet having a first surface and a second surface;
   a second sheet having a first surface and a second surface;
   said first surface of said first sheet and said first surface of said second sheet being bonded to a respective one of said two surfaces of said medial sheet;
   said first sheet and said second sheet each having a plurality of cavities each being larger than each of said plurality of cavities of said medial sheet;
   each of said plurality of cavities of said medial sheet being aligned to a corresponding cavity from said plurality of cavities of said first sheet and to a corresponding cavity from said plurality of cavities of said second sheet;
   each cavity of said first sheet with a corresponding cavity from said medial sheet and a corresponding cavity from said second sheet defining a generally hourglass shaped cavity;
   each of said cavities in said medial sheet defining a neck portion for one of said hourglass shaped cavities;
   a third sheet being bonded to said second surface of said first sheet to seal said cavities of said first sheet;

said third sheet being transparent;

each one of said plurality of hourglass shaped cavities being partially filled with a marking means;

a fourth sheet being bonded to said second surface of said second sheet to seal said cavities of said second sheet; and said marking means in each of said hourglass shaped cavities being responsive to an external field across its corresponding hourglass shaped cavity for movement of said marking means from its corresponding cavity of said second sheet through said neck portion into its corresponding cavity of said tint sheet.

15. The external field activated display sheet recited in claim 14, wherein said medial sheet is opaque.

16. The external field activated display sheet recited in claim 15, wherein said external field is an electric field.

17. The external field activated display sheet recited in claim 16, wherein said marking means so constructed and arranged to remain in its corresponding chamber after removal of the external electric field.

18. The external field activated display sheet recited in claim 17, wherein said marking means is a dyed liquid.

19. The external field activated display sheet recited in claim 17, wherein said marking means is a pigmented liquid.

20. The external field activated display sheet recited in claim 17, wherein said marking means is a liquid metal.

21. The external field activated display sheet recited in claim 17, wherein the portion of each hourglass shaped cavity which is not filled with marking means is filled with air.

22. The external field activated display sheet recited in claim 21, wherein said medial sheet, said tint sheet and said second sheet each has a plurality of connected pores.

23. The external field activated display sheet recited in claim 17, wherein the portion of each hourglass shaped cavity which is not filled with marking means is filled with an inert gas.

24. The external field activated display sheet recited in claim 23, wherein said medial sheet, said first sheet and said second sheet each has a plurality of connected pores.

25. The external field activated display sheet recited in claim 17, wherein the portion of each hourglass shaped cavity which is not filled with marking means is filled with a liquid.

26. The external field activated display sheet recited in claim 25, wherein said liquid is a clear liquid.

27. The extreme field activated display sheet recited in claim 25, wherein said liquid is a colored liquid.

28. The external field activated display sheet recited in claim 14, wherein said fourth sheet is transparent.

29. The external field activated display sheet recited in claim 15, wherein said external field is a magnetic field.

30. The external field activated display sheet recited in claim 29, wherein said marking means is ferrofluids.

31. The external field activated display sheet recited in claim 30, wherein said remaining portion of said plurality of hourglass shaped cavities are filled with air.

32. The external field activated display sheet recited in claim 31, wherein said medial sheet, said first sheet and said second sheet each has a plurality of connected pores.

33. The external field activated display sheet recited in claim 29, wherein remaining portion of said plurality of hourglass shaped cavities are filled with an inert gas.

34. The external field activated display sheet recited in claim 33, wherein said medial sheet, said first sheet and said second sheet each has a plurality of connected pores.

\* \* \* \* \*